United States Patent
Chrien

(10) Patent No.: US 9,195,071 B2
(45) Date of Patent: Nov. 24, 2015

(54) SPECKLE JITTER SENSOR

(75) Inventor: Thomas G. Chrien, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 22 days.

(21) Appl. No.: 12/900,671

(22) Filed: Oct. 8, 2010

(65) Prior Publication Data

US 2012/0086944 A1   Apr. 12, 2012

(51) Int. Cl.
| | |
|---|---|
| G01B 9/02 | (2006.01) |
| G02B 27/48 | (2006.01) |
| H04N 5/232 | (2006.01) |
| B64G 1/66 | (2006.01) |
| G01H 9/00 | (2006.01) |
| G02B 27/64 | (2006.01) |
| G01B 11/27 | (2006.01) |

(52) U.S. Cl.
CPC *G02B 27/48* (2013.01); *B64G 1/66* (2013.01); *G01H 9/002* (2013.01); *G02B 27/646* (2013.01); *H04N 5/23254* (2013.01); *H04N 5/23258* (2013.01); *G01B 11/272* (2013.01); *G03B 2217/005* (2013.01)

(58) Field of Classification Search
CPC .......... H04N 5/23254; H04N 5/23258; H04N 5/23251; G03B 2217/005; G01B 11/272; G02B 27/646; G02B 27/48; G01H 9/00; G01H 9/02
USPC .................. 356/450, 496–501, 508–516, 520
See application file for complete search history.

(56) References Cited

U.S. PATENT DOCUMENTS

| | | | |
|---|---|---|---|
| 3,661,465 A * | 5/1972 | Groh ............................. | 356/389 |
| 4,131,540 A * | 12/1978 | Husome et al. ............... | 209/582 |
| 4,352,565 A | 10/1982 | Rowe et al. | |
| H192 H * | 1/1987 | Daehler ..................... | 356/141.5 |
| 4,874,245 A * | 10/1989 | Spillman et al. .............. | 356/364 |
| 5,024,528 A * | 6/1991 | Freund et al. ................. | 356/496 |
| 5,585,616 A * | 12/1996 | Roxby et al. ............. | 235/462.06 |
| 5,750,986 A * | 5/1998 | Genovese .................... | 250/235 |
| 6,128,082 A | 10/2000 | Cloud | |
| 6,166,803 A | 12/2000 | Milton et al. | |
| 6,266,198 B1 | 7/2001 | Lipscomb | |
| 6,288,381 B1 | 9/2001 | Messina | |
| 6,653,611 B2 | 11/2003 | Eckelkamp-Baker et al. | |
| 7,227,627 B1 | 6/2007 | Bussard | |
| 7,295,324 B2 * | 11/2007 | Jones et al. ................... | 356/498 |
| 7,359,047 B2 | 4/2008 | Lippuner | |
| 7,435,942 B2 | 10/2008 | Lang | |
| 7,437,077 B2 | 10/2008 | Wirth et al. | |

(Continued)

FOREIGN PATENT DOCUMENTS

GB       2309777 A   *   8/1997

OTHER PUBLICATIONS

Sirohi et al. (Optical methods of measurement: wholefiled techniques; chapter: Speckle Metrology) / 2009 / Taylor and Francis Group, LLC / pp. 149-199.*
Edited by J.C. Dainty, authored by J.W. Goodman, Laser Speckle And Related Phenomena, 1984, pp. 20-27, Second Enlarged Edition, Sprinnger-Verlag, Berlin, Heidelberg, New York, Tokyo 1944.

(Continued)

*Primary Examiner* — Kara E Geisel
*Assistant Examiner* — Rufus Phillips
(74) *Attorney, Agent, or Firm* — Paul D. Chancellor; Ocean Law

(57) ABSTRACT

A jitter sensor including a light source and a light sensor utilizes speckle pattern analysis to detect motion.

38 Claims, 6 Drawing Sheets

(56) References Cited

U.S. PATENT DOCUMENTS

| | | | |
|---|---|---|---|
| 8,265,375 B2* | 9/2012 | Shirley | 382/154 |
| 2004/0195328 A1* | 10/2004 | Barber et al. | 235/454 |
| 2004/0233459 A1* | 11/2004 | Booth | 356/498 |

OTHER PUBLICATIONS

Edited by William N. Sharpe Jr., authored by Yimin Gan and Wolfgang Steinchen (deceased), Springer Handbook Of Experimental Solid Mechanics, 2008, pp. 655-673, Springer Science+Business Media, LLC New York.

* cited by examiner

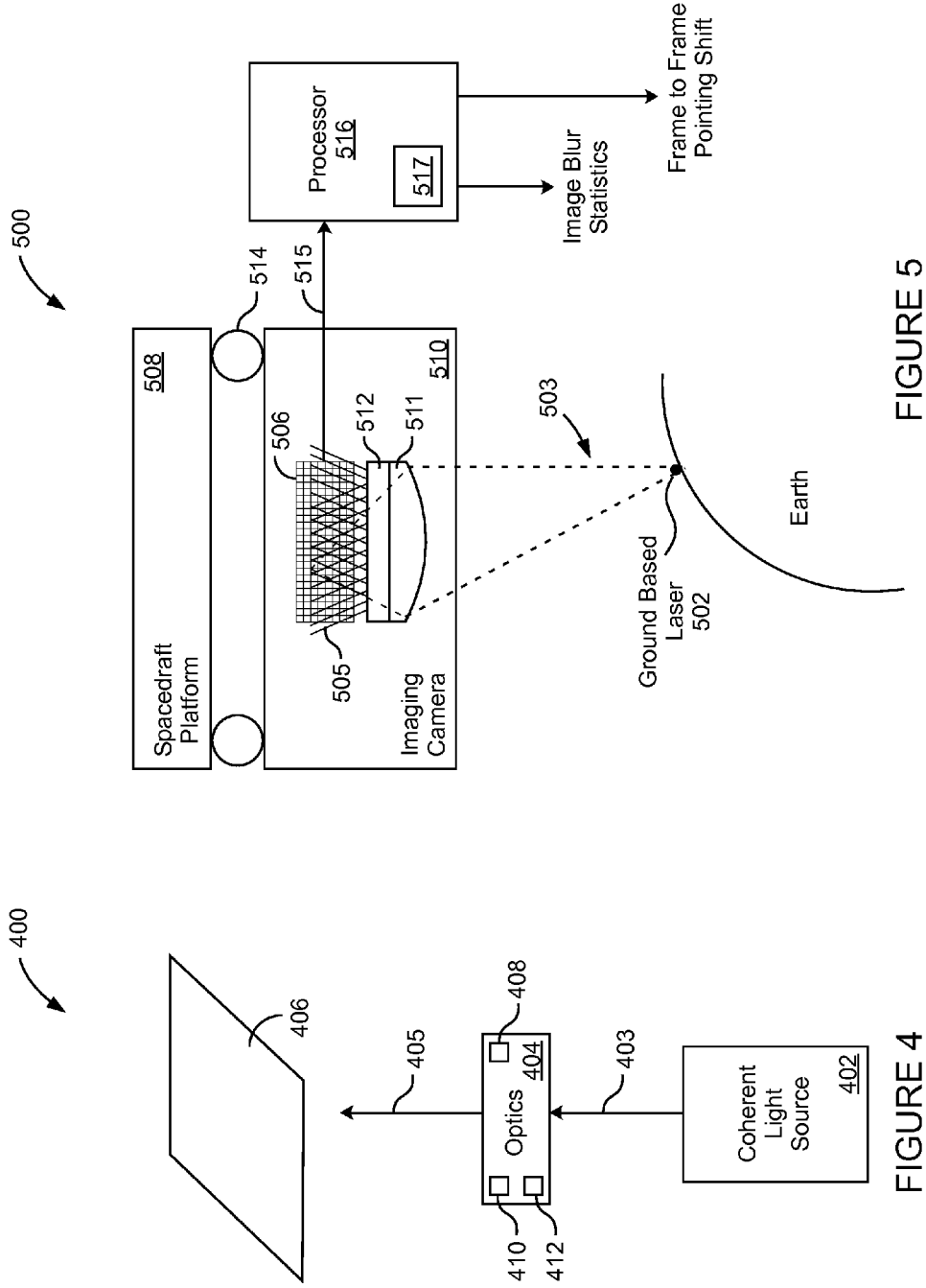

SPECKLE JITTER SENSOR

INCORPORATION BY REFERENCE

U.S. Pat. Nos. 4,352,565 filed Jan. 12, 1981 to Rowe et al. and 6,128,082 filed Jul. 21, 1999 to Cloud are incorporated herein by reference in their entirety and for all purposes, including in particular their disclosure of speckle analysis techniques.

BACKGROUND OF THE INVENTION

1. Field of the Invention

The invention relates to machines, manufactures, and processes and in particular to systems and methods for sensing jitter from speckle patterns.

2. Discussion of the Related Art

Jitter is a movement such as an irregular random movement. Jitter can be a detrimental influence in measurement systems. For example, jitter in systems including a motion sensor or imaging device such as a camera is undesirable as it tends to blur the measurement or image. Jitter sensitive systems may include a means for detecting and measuring jitter in order to, among other things, evaluate the effectiveness of jitter mitigation, mitigate the impact of blur, and discard blurred measurements.

Pointing jitter is frequently a performance constraint on space borne imaging sensors. In these systems, pointing jitter is typically measured using spacecraft attitude control system sensors or photodetectors. In particular, accelerometers used in spacecraft attitude control can be used to measure jitter. The jitter measured in this case is the jitter of the spacecraft.

FIG. 1 shows a schematic of a typical camera support 100. Here, a spacecraft or another structure 112 supports the camera 102. To the degree the spacecraft and camera are not rigid bodies with a rigid interconnection, one is free to move with respect to the other according to a complex transfer function 108.

An attitude control sensor 116 measures jitter of the spacecraft. Notably, the sensor does not measure jitter of the camera 102 or jitter of the camera boresight 104. However, if a transfer function 108 relating spacecraft jitter to camera boresight jitter is known, the camera boresight jitter can be predicted based on spacecraft jitter.

FIG. 2 shows a pixel scale indirect imaging system using autocollimation 200. Measuring system components include a light source 202, a mirror 204, and a quadrant detector 206 consisting of a 2×2 grid of photodetectors 208, 210, 212, 214.

The mirror 204 is attached to a device of interest such as a spacecraft or camera 207. During operation, the mirror reflects light 205 received 203 from the light source and a spot 221 at the center of the quadrant detector 223 is illuminated by the reflected light beam.

Where the mirror and one of the light source and the detector are located in different reference planes, for example on earth and in space, relative motion of the detector causes more or less light to shine on particular cells. The relative intensity of the four quadrants is used to determine the change in angle relative to the reference mirror and to indicate jitter.

As can be seen, the autocollimation sensor does not measure jitter of the camera boresight 104. However, if a transfer function 108 relating spacecraft jitter to camera boresight jitter is known, the camera boresight jitter can be predicted based on spacecraft jitter.

FIG. 3 shows a pixel scale direct imaging system 300. Direct imaging refers to imaging on the camera whose boresight jitter is to be measured. A point light source 310 and a camera 305 are located in different reference frames. The point light source is directed toward the center 304 of the camera's pixel array 302. A light beam 311 from the light source illuminates a spot 306 at the center of the array. Movement of the camera relative to the light source moves the light spot to a different location on the array. Pixel readings of light intensity indicate this movement and provide a measure of the extent and direction of camera boresight jitter.

As persons of ordinary skill in the art will appreciate, direct imaging of a projected point source is a pixel scale measuring technique. In addition, accuracy of this method is limited to the centroid noise of the camera. In summary, these prior art techniques for measuring pointing jitter suffer from one or more disadvantages including indirect measurement of pointing jitter, accuracy limitations due to pixel scale resolution, and accuracy limitations due to centroid noise of the camera.

SUMMARY OF THE INVENTION

The invention provides a speckle jitter sensor. In an embodiment, a detector for measuring sub-pixel pointing jitter comprises a coherent light source, an electro-optical sensor able to move relative to the light source, and an optical element between the light source and the sensor. The optical element is operative to project a speckle field on the sensor when the optical element is illuminated by the light source and the sensor is operative to acquire at least a first data frame representing a first speckle pattern. Speckle pattern analysis is operative to indicate relative motion between the electro-optical sensor and the light source.

In various embodiments, the above detector further includes a processor performing the speckle pattern analysis based on speckle blurring and/or speckle pattern correlation.

An embodiment of the invention provides a detector for directly measuring sub-pixel pointing jitter comprising a coherent light source, an electro-optical sensor able to move relative to the coherent light source, and an optical element between the light source and the sensor. The optical element is operative to project a speckle field on the sensor when the optical element is illuminated by the light source and the sensor is operative to acquire at least a first data frame representing a first speckle pattern. Speckle pattern analysis such as speckle correlation and/or speckle blurring is operative to indicate jitter of an optical axis of the sensor.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 4 shows a speckle jitter sensor in accordance with an embodiment of the present invention.

FIG. 5 shows a non-specialized speckle jitter sensor in accordance with an embodiment of the present invention.

DETAILED DESCRIPTION OF THE PREFERRED EMBODIMENTS

Figure 1:
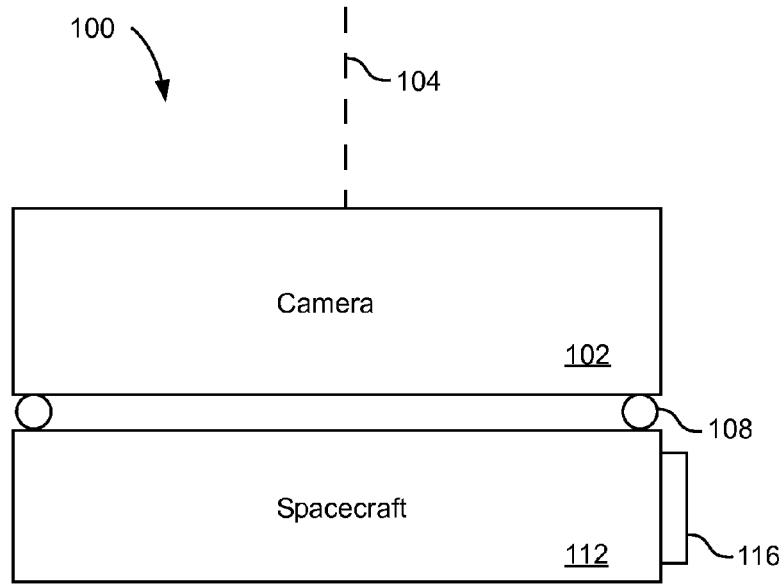
FIG. 1 shows a schematic of a prior art camera support.
Figure 2:
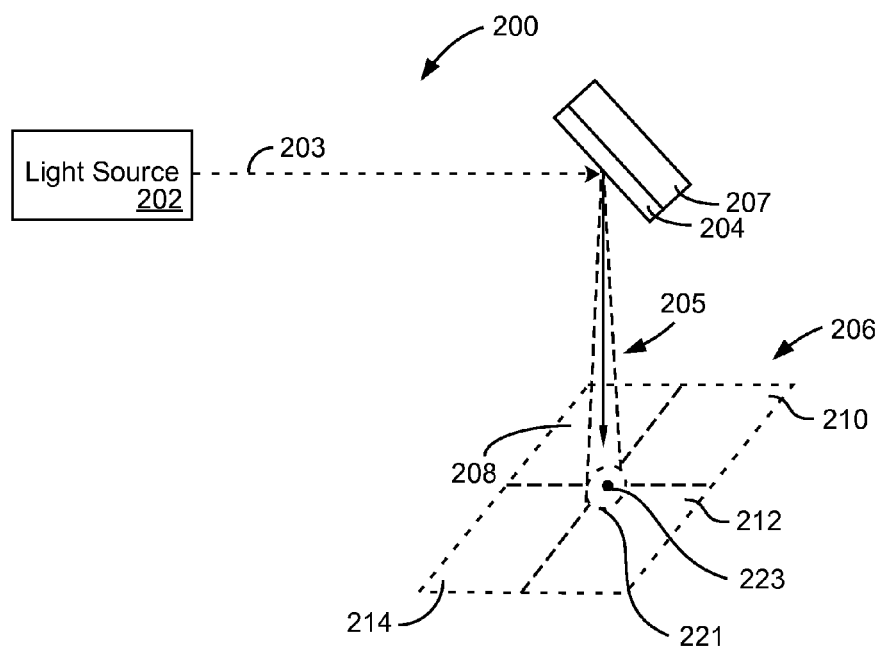
FIG. 2 shows a prior art pixel scale indirect imaging system using autocollimation.
Figure 3:
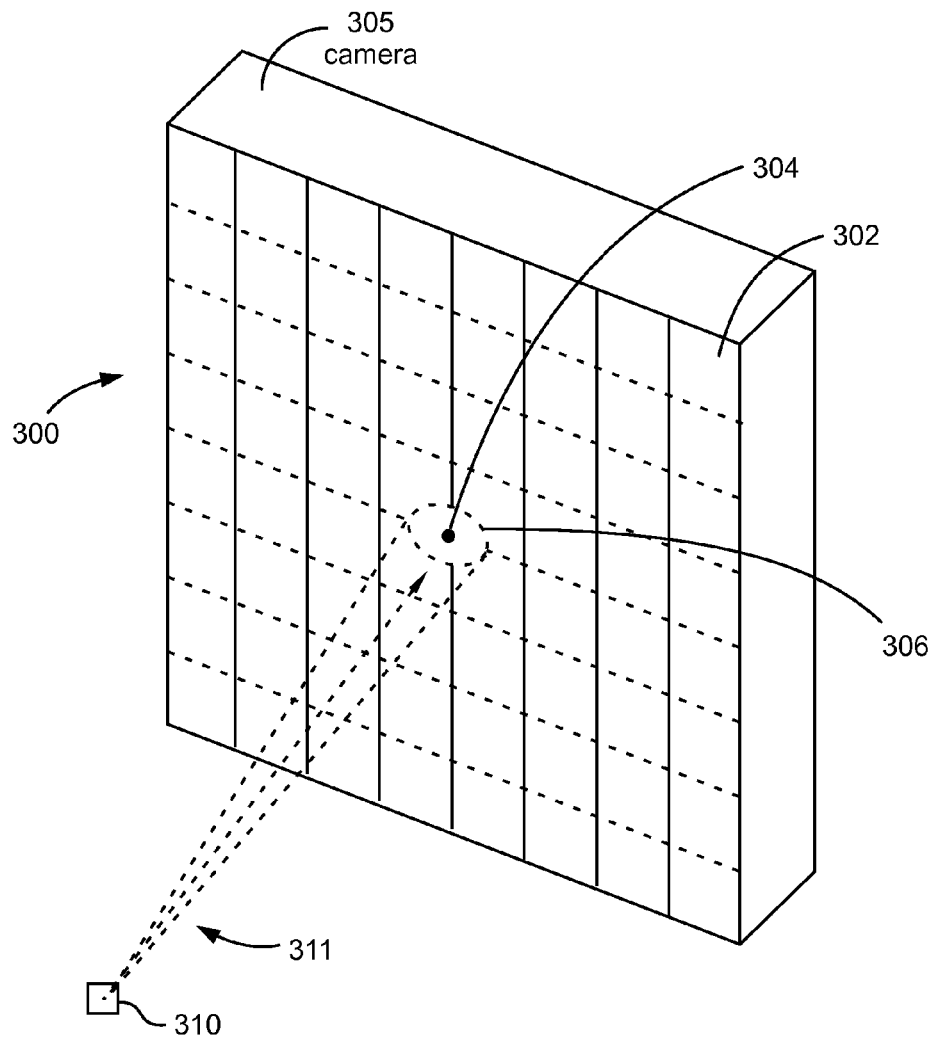
FIG. 3 shows a prior art pixel scale direct imaging system.

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

FIG. 4 shows a speckle jitter sensor in accordance with the present invention 400. The sensor includes a coherent light source 402, a photo detector 406 and an optics system 404. Light from the light source 403 illuminates the photo detector after passing through the optics system 405. As used herein, light refers to electromagnetic waves including the visible and infrared spectra.

In various embodiments, the light source 402 is free to move with respect to the photo detector 406. In some embodiments, one of the light source and photo detector are located in space, on a satellite for example, while the other is located on the earth. In an embodiment, the light source is located on the earth and the detector is located in space. In another embodiment, the light source is located in space and the detector is located on the earth. As used herein, light source includes active devices such as lasers and passive devices such as reflectors.

Photo detectors comprise any suitable electro-optical sensor including pixelated sensor arrays. For example, silicon semiconductor devices such as charge coupled devices ("CCD") and complementary metal oxide semiconductor devices ("CMOS") are used for embodiments with visible and near infrared light sources. Exemplary electro-optical sensors for use with infrared light sources include focal plane array devices ("FPA") utilizing non-silicon substrates such as HgCdTe, InSb, InGaAs, and VOx.

Optics systems include a surface capable of generating a statistically distributed, granular spatial speckle pattern. Such surfaces include optically rough surfaces for scattering light where optically rough means a surface with a surface roughness that is greater than the coherent light source wavelength. In an embodiment, the optical system 404 includes a ground glass diffuser 408.

Some optical systems include a means for focusing incoming light on the detector. In various embodiments, a focusing lens such as a plano-convex focusing lens is included in the optics system 410. And, in some embodiments optical systems include a means for setting or adjusting the speckle correlation length 412 such as a mask, aperture, or adjustable aperture blocking a portion of a ground glass diffuser.

In an embodiment, the optics system and the electro-optical sensor are proximate one another as in a packaged device or as with interconnected devices. For example, selected optics system elements can be included in a filter wheel associated with the photo detector.

FIG. 5 shows a non-specialized speckle jitter sensor utilizing a space borne imaging camera 500. An imaging camera 510 is supported by a spacecraft platform such as a satellite 508. In various embodiments, the spacecraft platform and imaging camera 510 are not rigid bodies with a rigid interconnection(s); rather, one is able to move with respect to the other according to a complex transfer function 514.

The imaging camera 510 includes a diffuser such as a ground glass diffuser 512 between a focusing lens 511 and an electro-optical sensor 506. A light beam 503 emanating from a ground based laser 502 is directed to the imaging camera and illuminates the optics 511, 512. The light leaving the diffuser 505 projects a speckle field on the electro-optical sensor.

Importantly, this embodiment measures jitter directly. The electro-optical sensor 506 of the imaging camera 510, whose images are to be corrected for jitter, is also used as the jitter sensor such that the jitter measured is the jitter of the imaging camera's boresight. No transfer functions are required to translate the effects of jitter on one part of an assembly with the corresponding effects on a non-rigidly coupled second part of the assembly.

Speckle analysis is typically performed in a digital processor, for example a digital processor located on the spacecraft 516. The digital processor receives data 515 from the electro-optical sensor 506.

During operation, coherent light is scattered by the diffuser producing a high resolution speckle pattern. The speckle pattern shifts as the angle of illumination from the coherent source shifts. The degree of pointing shift may be determined by analyzing the speckle pattern(s). For example, more or less change in the pointing angle due to jitter will result in more or less decorrelation of the laser speckle pattern over time.

Jitter is detected and jitter measurements are made by analyzing one or more speckle patterns. In a first speckle analysis method, speckle correlation methods are used to indicate motion. In a second speckle analysis method, speckle blurring analysis methods are used to indicate motion.

Where speckle analysis is by speckle correlation, at least two speckle patterns are required to detect object motion. A comparison of two speckle patterns imaged by the electro-optical sensor 506 provides, inter alfa, surface geometry change information. For example, two speckle patterns I and I' are acquired before and after movement and the speckle patterns/frames are digitally recorded by the electro-optical sensor and associated storage media 517.

In various embodiments, motion and/or a displacement field is determined using speckle correlation techniques known to persons of ordinary skill in the art. For example, motion and/or displacement fields may be determined by cross-correlation methods. In an embodiment, the cross-correlation method is used and it is implemented in the Fourier domain by using a Fourier transform (FT) algorithm. A description of speckle correlation including use of Fourier cross-correlation methods can be found in the Springer Handbook of Experimental Solid Mechanics, Pages 655-673, Edited by Professor William N. Sharpe. Jr., 2008, Springer Science+Business Media, LLC New York (see Chapter 23, Speckle Methods by Yimin Gan and Wolfgang Steinchen).

Where the speckle analysis method is speckle blurring, only a single speckle pattern imaged by the electro-optical sensor 506 is required to detect motion. Here, motion is detected when the acquired frame is compared with a reference or theoretical frame to determine displacements.

In various embodiments, motion and/or the displacement field are determined using speckle blurring techniques known to persons of ordinary skill in the art. For example, a theoretical probability density function ("TPDF") for speckle intensity can be constructed based on a known or estimated speckle size. A histogram derived from the acquired frame's intensities indicates motion to the extent it differs from the TPDF. In an embodiment, the histogram is constructed from intensity data that is calibrated for uniformity correction.

Blurring increases the apparent size of speckles and in some embodiments the excess of apparent speckle size over predicted speckle size indicates motion. For example, where actual average speckle size is found to be 5% greater than calculated average speckle size and camera integration time is one millisecond, this infers the speckle moved 5% of its width in one millisecond.

Average unblurred speckle size is calculated using methods known to skilled artisans, such as from the equation relating speckle size to light source wavelength and optics geometry: average size σ of objective speckles formed on a screen at a distance Z for a monochromatic uniform illumination over a circular surface area with diameter D is approximately given by:

$$\sigma \approx 1.22(\lambda Z/D)$$

where λ is the wavelength of the light. Excess speckle size is found by: a) constructing TPDF's for speckle sizes above and below the calculated speckle size; b) matching the TPDF's to the histogram; c) selecting the TPDF that best fits the histogram; and d) calculating the difference between the selected TPDF's speckle size and unblurred speckle size.

Descriptions of speckle size and theoretical probability density functions can be found in references including the above reference by Sharpe and also in Laser Speckle And Related Phenomenon, Pages 1-27 et seq., Edited by J. C. Dainty, 1984, Springer-Verlag, Berlin, Heidelberg, New York, Tokyo.

Figure 6:
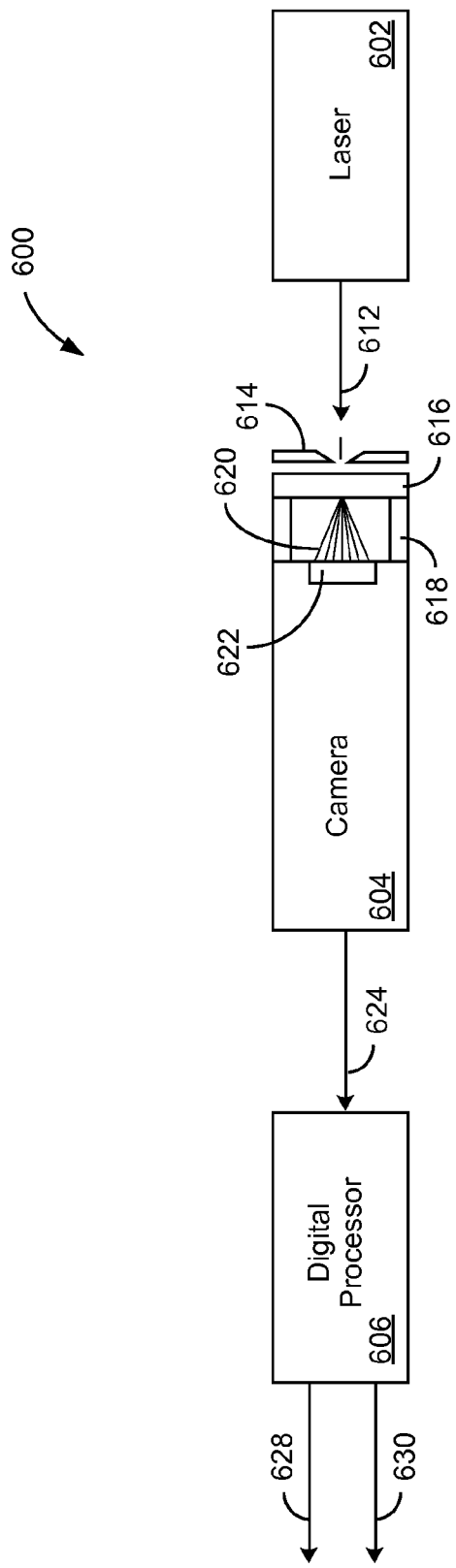
FIG. 6 shows a first specialized speckle jitter sensor in accordance with an embodiment of the present invention.

FIG. 6 shows a first specialized speckle jitter sensor 600. A camera 604 includes an electro-optical sensor such as an area-array sensor 622 that is for receiving light 612 from a laser light source 602. Before reaching the sensor, the laser light is scattered 620 by a diffuser 616 such that speckle field is projected on the electro-optical sensor. The diffuser is spaced apart from the electro-optical sensor by a means such as a spacer 618.

In some embodiments, an aperture 614 between the diffuser 616 and laser light source 602 provides a means to adjust speckle size. Speckle data such as electronic image frames are transferred via a data link, for example a wired or wireless link 624. The data link provides for data communication between the camera 604 and a digital processor such as a general or special purpose computer or a field programmable gate array device 606. One or more outputs of the processor include a motion indication signal derived from a speckle analysis, for example a speckle analysis based on speckle correlation and/or speckle blurring 628, 630.

The camera 604 and the laser 602 of the first specialized jitter sensor are mounted in different reference systems. Using this arrangement, the laser provides a boresight reference for the camera. In an embodiment, the camera is space borne and the laser is located on a planet such as planet earth. In this case, the camera boresight reference is with respect to the planet.

In another embodiment, the first specialized jitter sensor is used in connection with a testing platform such as a ground based testing platform. An exemplary use for this embodiment is experimental determination of transfer functions relating motion in one part of a spacecraft to motion in a coupled second part of the spacecraft.

Figure 7:
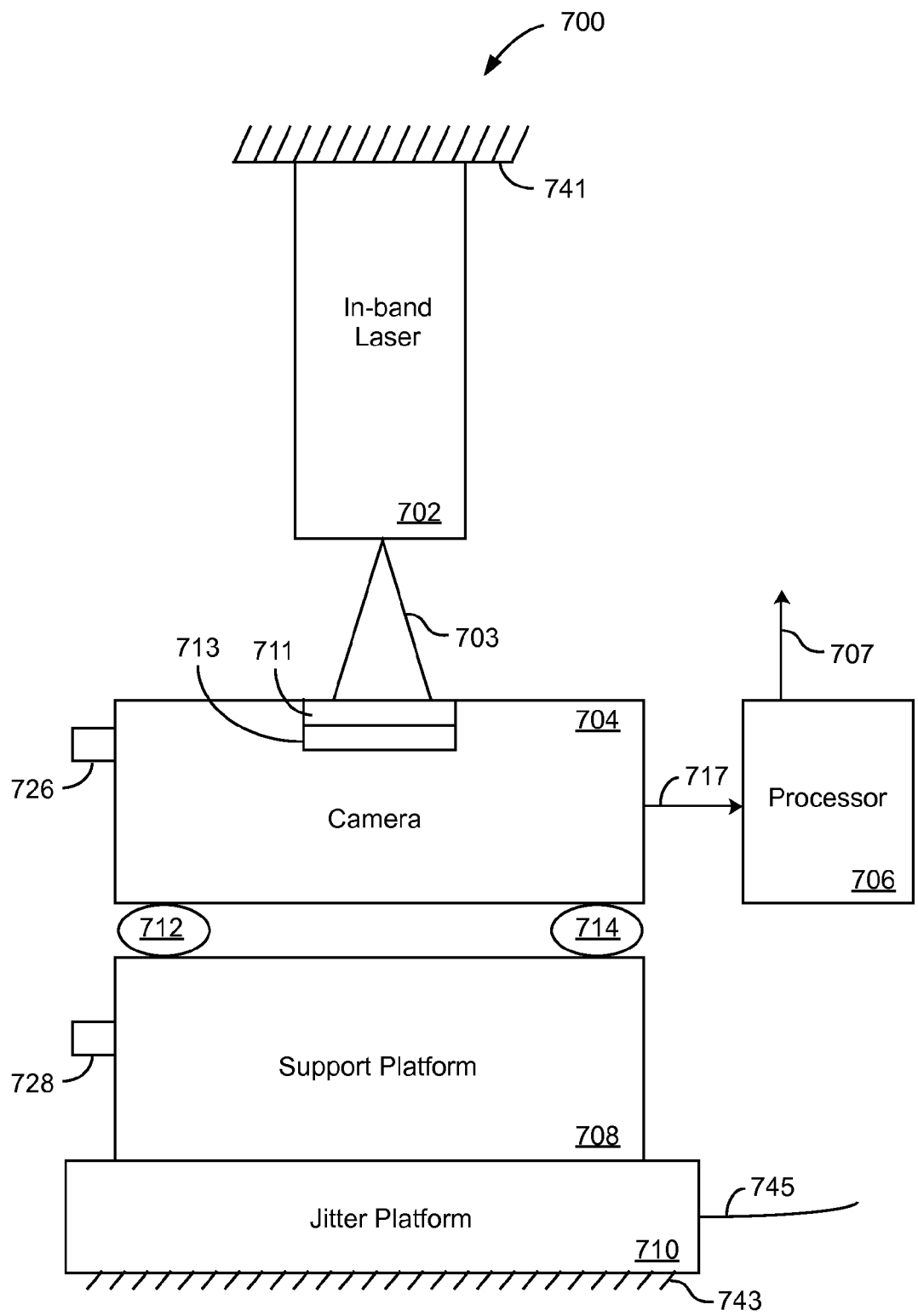
FIG. 7 shows the first specialized speckle jitter sensor of FIG. 6 incorporated in a testing platform.

FIG. 7 further illustrates a first specialized jitter sensor incorporated in a testing platform 700. Here, a camera 704 includes an optical system 711 and an electro-optical sensor 713. A laser light source for illuminating the camera 702 is ground supported 741. The camera is supported by a camera platform such as a spacecraft platform 708 whose jitter is to be determined from camera jitter. A jitter platform 710 fixed to the ground 743 supports the camera platform and is capable of exciting the support platform which supports the camera.

In some embodiments, the jitter platform is rigidly coupled to the support platform and in some embodiments the excitation imparted by the jitter platform is quantitatively selectable or observable 745 by a user. In an embodiment, an accelerometer is affixed to the camera 726 and in an embodiment an accelerometer is affixed to the support platform 728.

As discussed above, speckle analysis takes place in a processor 706 in signal communication 717 with the camera. A processor output 707 provides information about motion of the camera relative to the ground. In various embodiments, the accelerometers 726, 728 are used to calibrate the results obtained from speckle analysis.

In operation, the laser illuminates 703 the camera optics 711 and projects a speckle pattern on the electro-optical sensor 713. Relative motion between the laser 702 and the camera's electro-optical sensor 713 results in changes in the speckle pattern projected on the electro-optical sensor which are analyzed to detect motion 707.

The transfer function(s) between the camera and support platform 712, 714 are determined using methods known to persons of ordinary skill in the art. For example, the transfer function(s) between the camera and the support platform are determined when motion of the camera 707 is correlated with motion of the spacecraft platform 728, 745.

Figure 8:
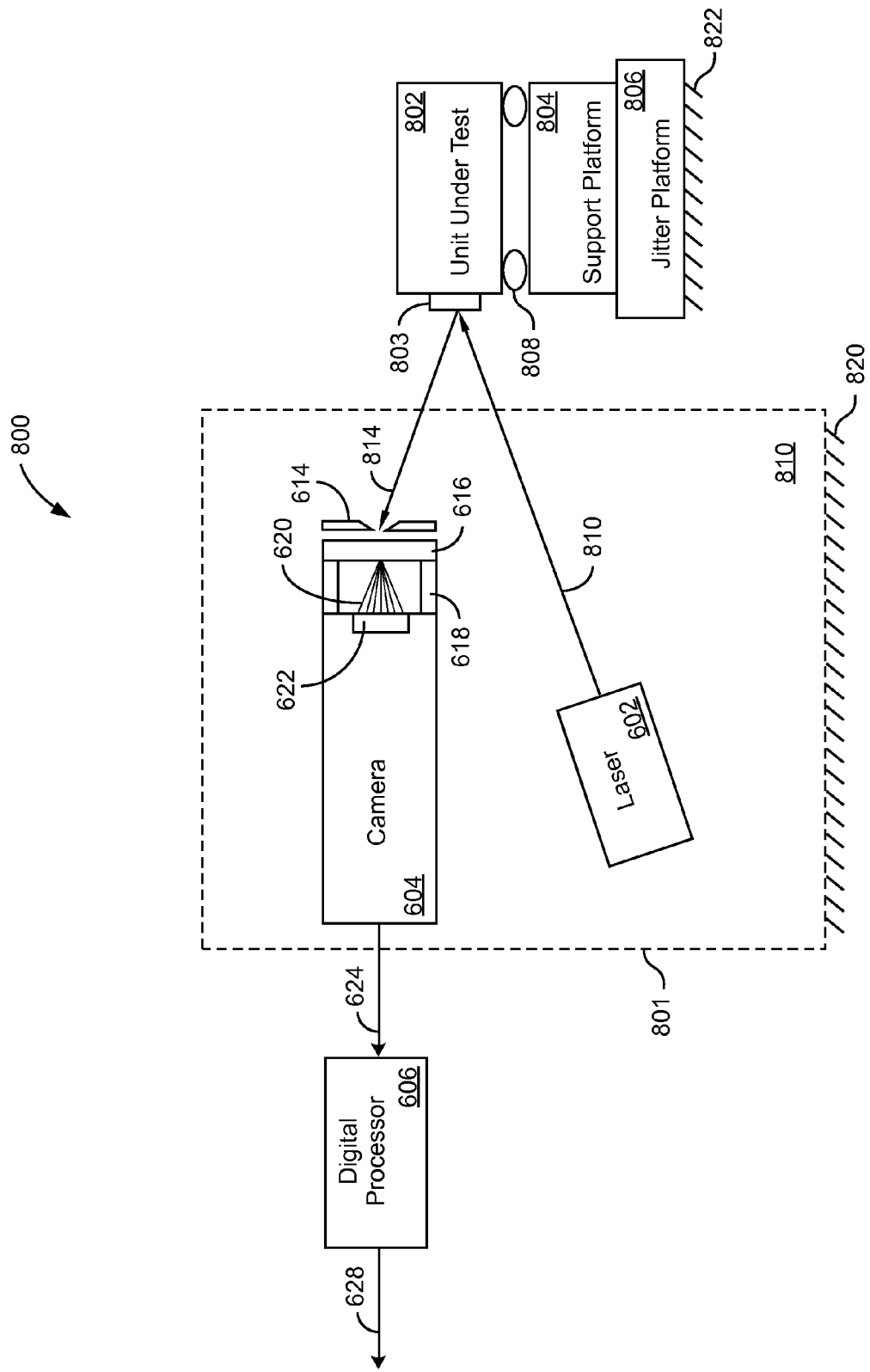
FIG. 8 shows a second specialized speckle jitter sensor in accordance with an embodiment of the present invention.

FIG. 8 shows a second specialized jitter sensor 800. A camera 604 includes an electro-optical sensor such as an area-array sensor 622. The array-area sensor receives light 814 from a light source in the form a reflector 803 that is attached to an object of interest 802. In an embodiment, the reflector is a flat mirror. Before reaching the electro-optical sensor, the light is scattered 620 by a diffuser 616 such that a speckle field is projected on the electro-optical sensor. In some embodiments, an aperture 614 between the diffuser 616 and light source 803 provides a means to adjust speckle size. The source of the light reflected by the mirror is a laser 602 emitting a light beam 810 that strikes the mirror.

Speckle data such as electronic image frames are transferred via a data link, for example a wired or wireless link 624. The data link provides for data communication between the camera 604 and a digital processor such as a general or special purpose computer or a field programmable gate array device 606.

The camera 604 and the laser 602 of the second specialized jitter sensor are mounted in the same reference system. And, in an embodiment, the camera and the laser are mounted in a common package. Using this arrangement, the mirror provides a boresight reference for the camera.

Motion of the reflector 802 changes the spatial relationship between the reflector, laser 602 and camera 604 such that the speckle pattern incident on the sensor is changed. Speckle patterns analyzed in the processor 606 determine whether the object of interest has moved relative to the laser and camera.

In an embodiment, a laser and camera package 801 is mounted on earth and the mirror is attached to a space vehicle 802. Such an arrangement provides for detecting jitter of the space vehicle.

In another embodiment, a laser and camera package 801 is mounted on earth 820 and the mirror is attached to an object of interest 802. Here, the object of interest is supported by a support platform 804. A transfer function 808 relates motion of the object of interest to motion of the support platform. The support platform is in turn supported by a jitter platform 806 mounted to the earth 822. As discussed above, estimates of the transfer function can be made by correlation jitter platform motion with motion of the object of interest 802 as indicated by the speckle jitter sensor 628.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A detector for measuring sub-pixel pointing jitter comprising:
   an active coherent light source;
   an electro-optical sensor including a pixelated sensor array, the electro-optical sensor able to move in three dimensions relative to the light source;
   a diffuser located on an optical axis extending between the light source and the sensor;
   the diffuser operative to projects a speckle field on the sensor when the diffuser is illuminated by the light source;
   the sensor acquires at least a first digital data frame representing a first speckle pattern;
   a digital processor performing speckle pattern analysis based on speckle blurring or speckle pattern correlation; and,
   acquired speckle pattern data is analyzed and used to indicate indicative of relative motion between the electro-optical sensor and the light source.

2. The detector of claim 1 further including a digital processor performing the speckle pattern analysis based on speckle blurring.

3. The detector of claim 1 further including a digital processor performing the speckle pattern analysis based on speckle pattern correlation.

4. The imaging device of claim 1 wherein the diffuser illuminates at least a majority of a surface of the electro-optical sensor that faces the lens.

5. The imaging device of claim 4 wherein the diffuser is a ground glass lens.

6. The imaging device of claim 1 wherein the coherent light source is an earth located laser and the diffuser is a celestially located light scattering surface.

7. The imaging device of claim 1:
   wherein the diffuser is a single diffusing lens;
   wherein the lens is physically coupled to a space located satellite; and,
   wherein the coherent light source is an earth located laser, the laser and the lens configured to illuminate at least a majority of a surface of the electro-optical sensor that faces the lens.

8. The imaging device of claim 7 avoiding the use of mirrors.

9. The imaging device of claim 7 wherein the optical axes of the optical element and the sensor are coincident.

10. A detector comprising:
    a coherent light source;
    a digital processor and an electro-optical sensor including a pixelated sensor array, the electro-optical sensor able to move in three dimensions relative to the coherent light source;
    an optical element having a single optical axis that is coincident with a single optical axis extending between the light source and the sensor;
    the optical element operative to project a speckle field on the sensor when the optical element is illuminated by the light source;
    the sensor operative to acquire at least a first digital data frame representing a first speckle pattern;
    the digital processor performing speckle pattern analysis based on speckle blurring or speckle pattern correlation; and,
    analysis of acquired speckle pattern data used to measure sub-pixel jitter of an optical axis of the sensor.

11. The detector of claim 10 further including a digital processor performing the speckle pattern analysis based on speckle blurring.

12. The detector of claim 10 further including a digital processor performing the speckle pattern analysis based on speckle pattern correlation.

13. The detector of claim 10 wherein the electro-optical sensor is attached to a spacecraft for receiving light from sources remote from the spacecraft.

14. The detector of claim 13 configured to acquire photographic images of celestial bodies in addition to speckle pattern images.

15. The detector of claim 13 wherein the coherent light source is a reflector.

16. The detector of claim 13 wherein the coherent light source is a laser.

17. The detector of claim 16 wherein the optical element includes a diffuser.

18. The detector of claim 17 wherein the optical element includes an aperture.

19. The detector of claim 18 further including a digital processor for analyzing speckle patterns.

20. A detector for directly measuring sub-pixel pointing jitter comprising:
    a reflector operable to reflect coherent light;
    an electro-optical sensor including a pixelated sensor array, the electro-optical sensor able to move in three dimensions relative to the reflector;
    an optical element located on a single optical axis extending between the reflector source and the sensor;
    the optical element operative to project a speckle field on the sensor when the optical element is illuminated by the reflected light;
    the sensor acquires at least a first digital data frame representing a first speckle pattern; and
    a digital processor performing speckle pattern analysis based on speckle blurring or speckle pattern correlation; the processor calculates the jitter of an optical axis of the sensor based on the analysis of the acquired speckle pattern data.

21. The detector of claim 20 further including a digital processor performing the speckle pattern analysis based on speckle blurring.

22. The detector of claim 21 further including a digital processor performing the speckle pattern analysis based on speckle pattern correlation.

23. The detector of claim 21 further including a digital processor performing the speckle pattern analysis based on blurring and speckle pattern correlation.

24. The detector of claim 21 wherein the electro-optical sensor is mounted on a spacecraft.

25. The detector of claim 24 wherein the electro-optical sensor acquires photographic images of celestial bodies in addition to speckle pattern images.

26. The detector of claim 24 wherein the coherent light source is a laser.

27. The detector of claim 26 wherein the optical element includes a diffuser.

28. The detector of claim 27 wherein the optical element includes an aperture.

29. The detector of claim 28 further including a digital processor for analyzing speckle patterns.

30. A detector for measuring sub-pixel pointing jitter comprising:
 a laser light source;
 an area array sensor including a pixelated sensor array able to move in three dimensions relative to the light source during normal operation of the detector;
 a diffuser located on a single optical axis extending between the light source and the sensor;
 the diffuser projects a speckle field on the sensor when the optical element is illuminated by the light source;
 the sensor acquires a single digital data frame representing a first speckle pattern;
 a digital processor performing speckle pattern analysis based on speckle blurring or speckle pattern correlation; and,
 the detector uses two or more speckle patterns including the first speckle pattern to indicate motion of the sensor relative to the light source.

31. The detector of claim 30 further comprising:
 a processor that provides results from first speckle pattern speckle blur analysis; and,
 wherein movement of the sensor relative to the light source is indicated by the blur results.

32. The detector of claim 30 further comprising:
 a second data frame representing a second speckle pattern;
 a processor that provides results from first and second speckle pattern correlation; and,
 wherein movement of the sensor relative to the light source is indicated by the correlation results.

33. A detector for measuring sub-pixel pointing jitter comprising:
 a laser light source;
 a spacecraft and a plurality of celestial bodies:
 a spacecraft camera having a single optical axis, the camera configured to acquire images from an included pixelated sensor array;
 the camera acquires images of one of the celestial bodies;
 the camera assesses camera sub-pixel pointing jitter;
 an optical element located on an optical axis extending between the light source and the sensor;
 laser illumination of the optical element projects a speckle field on the sensor;
 the sensor acquires a single digital data frame representing a first speckle pattern;
 a digital processor performing speckle pattern analysis based on speckle blurring or speckle pattern correlation; and,
 the detector uses one or more speckle patterns including the first speckle pattern and indicates motion of the sensor relative to the light source.

34. A detector for measuring sub-pixel pointing jitter comprising:
 a coherent light source;
 an electro-optical sensor including a pixelated sensor array, the electro-optical sensor able to move relative to the light source;
 a diffuser located on a an optical axis extending between the light source and the sensor;
 the sensor and the diffuser arranged in a fixed geometric relationship;
 wherein the diffuser is operative to project a speckle field on the sensor when the diffuser is illuminated by the light source;
 the sensor operative to acquire at least a first digital data frame representing a first speckle pattern;
 a digital processor performing speckle pattern analysis based on speckle blurring or speckle pattern correlation; and,
 the processor calculates the sub-pixel jitter of an optical axis of the sensor, based on the speckle pattern analysis.

35. The detector of claim 34 wherein the diffuser is a ground glass diffuser.

36. The detector of claim 34 wherein the speckle pattern analysis is speckle blurring.

37. The detector of claim 34 wherein the speckle pattern analysis is speckle pattern correlation.

38. A detection method for measuring sub-pixel pointing jitter comprising the steps of:
 providing an active coherent light source;
 providing an electro-optical sensor including a pixelated sensor array, the electro-optical sensor able to move in three dimensions relative to the light source;
 locating an optical element on a single optical axis extending between the light source and the sensor;
 operating the optical element to project a speckle field on the sensor when the optical element is illuminated by the light source;
 operating the sensor to acquire at least a first digital data frame representing a first speckle pattern;
 performing speckle pattern analysis based on speckle blurring or speckle pattern correlation; and
 calculating the relative motion between the electro-optical sensor and the light source based on the speckle pattern analysis.

* * * * *